United States Patent [19]
Robertson et al.

[11] Patent Number: 5,631,635
[45] Date of Patent: May 20, 1997

[54] MESSAGE/RESPONSE TRACKING SYSTEM AND METHOD FOR A TWO-WAY SELECTIVE CALL RECEIVING DEVICE

[75] Inventors: Karen S. Robertson, Boca Raton; Paula Gabrielle, Ft. Lauderdale, both of Fla.

[73] Assignee: Motorola, Inc., Schaumburg, Ill.

[21] Appl. No.: 436,107

[22] Filed: May 8, 1995

[51] Int. Cl.$^6$ ...................................................... H04Q 7/12
[52] U.S. Cl. ........................... 340/825.47; 340/825.44; 340/311.1; 379/56; 455/57.1; 455/70
[58] Field of Search .......................... 340/311.1, 825.44, 340/825.47, 825.52, 825.69; 364/705.05; 379/56; 455/49.1, 57.1, 67.7, 70, 38.2, 38.4, 343

[56] References Cited

U.S. PATENT DOCUMENTS

| | | | |
|---|---|---|---|
| 4,868,560 | 9/1989 | Oliwa et al. | 340/825.44 |
| 5,153,582 | 10/1992 | Davis | 340/825.44 |
| 5,396,660 | 3/1995 | Cannon | 340/825.44 X |
| 5,444,438 | 8/1995 | Goldberg | 340/825.44 |
| 5,463,382 | 10/1995 | Nikas et al. | 340/825.47 X |

*Primary Examiner*—Michael Horabik
*Assistant Examiner*—William H. Wilson, Jr.
*Attorney, Agent, or Firm*—Keith A. Chanroo

[57] ABSTRACT

A two-way selective call receiving device is responsive to the receipt of a message with an identifier falling within a limited set of possible identifiers in order to control the ability of the selective call receiving device to transmit a response to a prior message having the same identifier. The selective call receiving device utilizes a tracking table that stores information tracking received messages with their associated identifiers. A controller determines whether a prior message having the same identifier as a newly received message is stored in the device and for which a response has not already been transmitted. If so, the controller prevents a response to the prior message from thereafter being transmitted.

23 Claims, 2 Drawing Sheets

MESSAGE/RESPONSE TRACKING SYSTEM AND METHOD FOR A TWO-WAY SELECTIVE CALL RECEIVING DEVICE

FIELD OF THE INVENTION

The present invention relates to a selective call receiving device capable of receiving messages and transmitting responses to received messages and more particularly to a message/response tracking system for a two-way selective call receiving device that is responsive to the receipt of a message with an associated identifier selected from a predetermined range of identifiers to control the ability of the pager to respond to prior messages having the same identifier as the given identifier of the newly received message.

BACKGROUND OF THE INVENTION

Known selective call receiving devices, such as a pager, receive paging messages from a message transmission station, such as a base station or the like, of a paging system. For a two-way pager that includes a transmitter for transmitting a response to a given message, it is necessary for the paging system to be able to correlate a message sent to the pager with a response received from the pager. This correlation could be accomplished using a unique identifier associated with each message wherein the unique identifier cannot be reused. However, this would require the paging system to maintain an enormous database of all messages that are sent out to selective call receiving devices for which a response is possible in order to correctly correlate a received responses with the message for which the response was generated.

SUMMARY OF THE INVENTION

In accordance with the present invention, the disadvantages of prior two-way selective call receiving devices as discussed above have been overcome. The two-way selective call receiving device of the present invention is responsive to the receipt of a message with an identifier to control the ability of the selective call receiving device to respond to a prior message having the same identifier associated therewith as the identifier received with the new message.

More particularly, the two-way selective call receiving device of the present invention includes a system for tracking received messages to enable a response to be correlated with an associated message for which the response was generated. The tracking system of the two-way selective call receiving device includes a receiver for receiving a signal containing a message and an identifier associated with the message wherein the identifier falls within a limited set of possible identifiers. A memory in the selective call receiving device stores information tracking received messages with their associated identifiers. A controller is responsive to a received message having a given identifier for searching the memory to determine whether a prior message has been received with an identifier that is the same as the given identifier of the received message and for which a response has not previously been transmitted. If so, the controller prevents a response to the prior message from thereafter being transmitted. The system of the present invention therefore ages out the ability to respond to old messages so that responses can be correlated to messages without the necessity of maintaining an enormous database.

These and other advantages and novel features of the present invention, as well as details of an illustrated embodiment thereof, will be more fully understood from the following description and drawings.

DESCRIPTION OF THE PREFERRED EMBODIMENT

Figure 1:
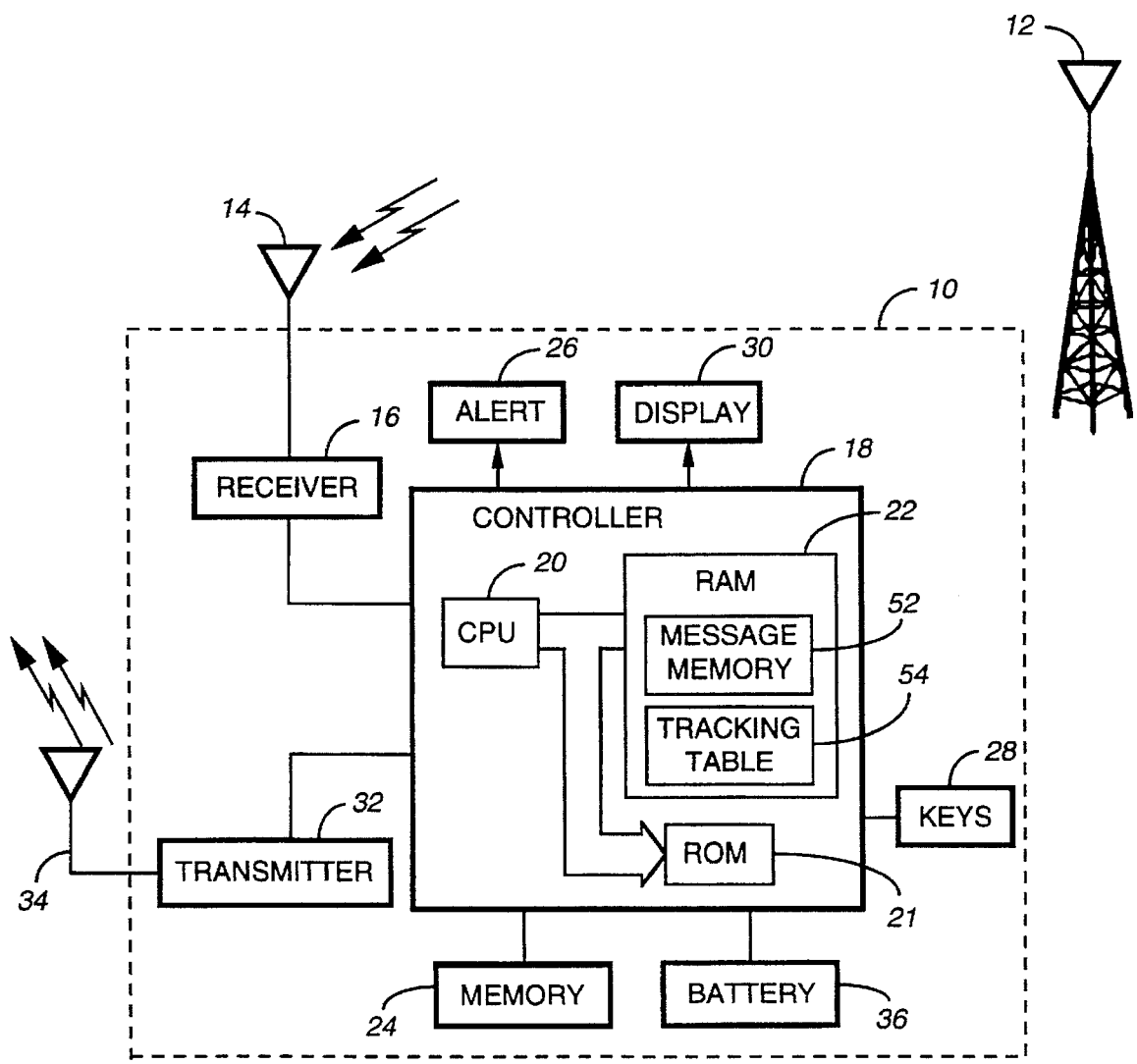
FIG. 1 is a block diagram of a selective call network illustrating in detail a two-way selective call receiving device in accordance with a preferred embodiment of the present invention.

A two-way selective call receiving device 10 such as a two-way pager is illustrated in FIG. 1 as receiving and transmitting radio frequency (RF) signals from and to a paging system 12. The paging system 12 receives input messages or page initiation messages from an input device such as a telephone. The paging system 12 generates a paging message signal in accordance with a particular signalling protocol and transmits the paging signal for reception by a particular selective call receiving device 10 in accordance with an identification of the device 10 contained in the paging signal. A suitable signalling protocol for a two-way paging system may be such as REFLEX; although, other signaling protocols may be used with the present invention as well.

The REFLEX protocol has a frame structure that includes synchronization information followed by address information including a pager address that identifies a particular selective call receiving device 10. The frame also includes paging message fields and a vector field associated with each paging message wherein the vector field is a type of header that points to a particular message in the frame. One portion of the vector field is a signature which, in REFLEX is a seven bit value representing one of 128 numbers extending from 0 to 127. This seven bit signature value is used as an identifier that is associated with a particular message pointed to by the vector field. It is noted that other fields of a paging signal may be used as an identifier of a message contained within the signal in accordance with the present invention. Each identifier should fall within a limited set of possible identifiers where each identifier is unique only within the set. The same set of identifiers may be used for different pagers where the pager address distinguishes responses received from different pagers. Therefore, the paging system 12 need only store for each pager, at most, a number of messages that is equal to the number of identifiers in the set. When the seven bit signature field is used for an identifier as described above, the paging system needs only the capacity to store at most 128 messages for each pager in order to implement the tracking scheme. This is a manageable amount of data for the paging system to store in order to correlate messages and responses thereto.

The two-way selective call receiving device 10 includes an antenna 14 for intercepting transmitted RF signals. The antenna 14 couples the received signals to a receiver 16 that demodulates the analog signal and decodes the signal into a digital paging signal. The digital paging signal is coupled to a controller 18 having a central processing unit 20 that processes the received paging signal in accordance with software stored in a read only memory i.e. ROM 21 or the like. A random access memory i.e. RAM 22 is used to store variables derived during processing and to store the received paging message in a message memory 52. A tracking table 54 as discussed in detail below is also stored in the RAM 22 in order to store information identifying received messages in association with the identifier of the received message.

The paging signal received by the device 10 as discussed above includes a device address that identifies the particular selective call receiving device 10. The controller 18 comparing the device address contained in a received paging signal with one or more addresses stored in a memory 24 which may be a code plug memory or the like. If the controller 18 detects a match between a received device address and a stored address, a signal is generated via an alerting device 26 in order to alert a user that a paging message has been received by the device 10. The alerting device may generate an audible alert and/or a silent, tactile alert such as vibration. Switches or keys 28 allow the user of a selective call receiving device to select or otherwise input information to the pager 10 so that a response to a given message may be generated. A response signal for a given message includes the identifier of the given message, the response signal being transmitted as an RF signal by a transmitter 32 via an antenna 34. The two-way selective call receiving device 10 is powered by a battery 36 and may include a power switch or the like that is coupled to the controller 18 in order to control the supply of power to the receiver 16 in order to provide a battery saving function as is well-known.

Figure 2:
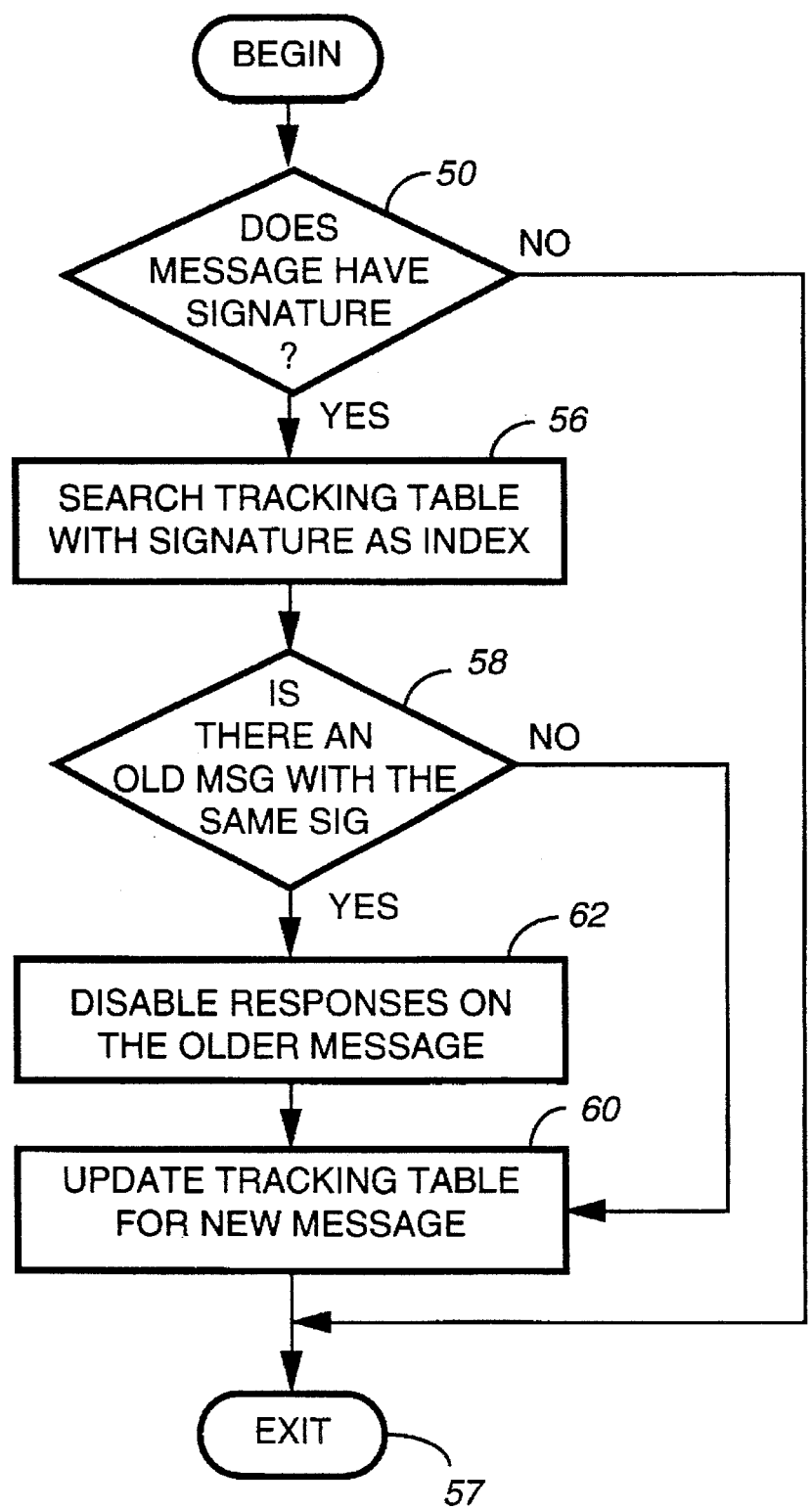
FIG. 2 is a flow chart illustrating a software routine implemented by the selective call receiving device depicted in FIG. 1 for tracking received messages and for controlling the ability of the device to respond to old messages.

The controller 18 controls the ability of the two-way selective call receiving device 10 to respond to received messages in accordance with the flow chart depicted in FIG. 2. After the CPU 20 determines that a received paging signal was intended for the selective call receiving device 10, the CPU 20 at a block 50 determines whether the message contained in the received signal has an associated signature, i.e. identifier falling within the predetermined, limited set of possible identifiers. If not, the controller exits the routine of FIG. 2 at a block 51 and stores the received message in the a message memory 52 of the random access memory 22. If the CPU 20 determines at block 50 that the received message does have a signature or identifier, the CPU 20 proceeds to a block 56. At block 56 the CPU 20 searches the tracking table 54 using the signature or identifier of the received message as an index to the table.

The tracking table 54 stores data representing each of the identifiers in the set of possible identifiers. In accordance with the example discussed above in which a seven bit signature field is utilized as the identifier, the tracking table will store data representing 128 values from 0 through 127. The tracking table 54 also stores in association with the identifiers tracking information identifying the last message received with a given identifier. More particularly, each message received with an identifier is stored at an addressable location in the memory 52 along with additional information. This additional information stored in the memory 52 for each message having an identifier includes a response flag that is set if a response to the particular message can be generated and transmitted by the device 10. The flag is cleared if no response to the message is allowed. The tracking table 54 stores in association with a given identifier the address to the location in the memory 52 of the last message received by the device 10 having that given identifier.

Once the CPU 20 has found the identifier of a received message in the tracking table 54 at block 50, the CPU 20 proceeds to block 58. At block 58 the CPU 20 determines whether the tracking table 54 stores an address for a previously received message, i.e. old or prior message that had the same identifier as the given identifier in the newly received message. If no address is stored in association with the identifier of the newly received message as determined at block 58, the CPU 20 proceeds to block 60 to update the tracking table 54 with the address for the new message identifying the location where the new messages is stored in the memory 52. If the CPU 20 determines at block 58 that the tracking table 54 has already stored therein in association with the identifier of the newly received message an address of an old message, the CPU 20 proceeds to block 62. At block 62 the CPU 20 disables responses on the older, prior message in order to prevent a response to the prior message from being generated and/or transmitted. More particularly, the CPU 20 at block 62 clears the response flag in the memory 52 associated with the prior message so that the cleared status of the flag indicates that no response to the prior message will be allowed. It is noted that the prior message may still be stored or maintained in the memory 52 until the user deletes the message or the message is automatically deleted by the controller 18 on a first in first out basis once the memory 52 reaches its capacity. From block 62, the CPU 20 proceeds to block 60 to update the tracking table 54 with the address for the newly received message so that the address of the new message in the memory 52 is stored in the tracking table 54 in association with the identifier received with the new message. Therefore, in accordance with the flow chart depicted in FIG. 2, the controller 18 can age out the ability of the device 10 to respond to old messages so that responses can be correlated to messages without the necessity of maintaining enormous databases.

The user may input information to the selective call receiving device 10 in order to generate a response for transmission therefrom as follows. As the user is viewing a message stored in the memory 22, the message may be displayed with a response icon if the device 10 will allow a response to be made for the displayed message. If a response will not be allowed, the message is displayed without the response icon being shown. If the response icon is displayed and the user selects the response option via one or more of the input keys 28, the controller 18 may control the display 30 to depict a set of possible canned responses for the user's selection via the keys 28. It is noted that the device 10 may also allow the user to enter variable alpha-numeric information as a response using the keys 28 as well. After the user selects or inputs a response for the particular message, the controller 18 generates a response signal that includes the identifier associated with the message for which the response was generated. The digital response signal is coupled to the transmitter 32 which modulates and transmits the response via the antenna 34 as a radio frequency signal. When a response for a particular message is generated, the controller 18 may update the tracking table 54 to delete therefrom the address of that particular message if desired.

When the paging system 12 receives the response from the particular selective call receiving device 10, the paging system can correlate the response with the last message transmitted therefrom having the same identifier as contained within the received response signal. Therefore, the message/response tracking system of the present invention provides a very efficient method of tracking and correlating messages with the responses thereto without requiring enormous amounts of data to be maintained.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A two-way selective call receiving device for disabling a response to a previously stored message, comprising:

a receiver for receiving a message and an identifier associated with said message, said identifier falling within a limited set of possible identifiers that are reusable;

a memory, coupled to the receiver, for storing the message and the identifier associated with said message;

a controller, responsive to a received message having a given identifier, for searching said memory to determine if said memory has a previously stored message associated with an identifier that is the same as said given identifier, said controller preventing a response to said previously stored message from thereafter being transmitted if said controller determines that the previously stored message has been received with an identifier that is the same as said given identifier;

a transmitter, coupled to the controller, for transmitting the response to the received message wherein said response is associated with said given identifier of the received message.

2. A two-way selective call receiving device as recited in claim 1 wherein said memory includes a table for storing the message being received with its associated identifier forming an index to said table.

3. A two-way selective call receiving device as recited in claim 2 wherein said table associates the message with the identifier that are repeatable within said possible range of identifiers.

4. A two-way selective call receiving device as recited in claim 1 wherein the response to the previously received message is associated with the given identifier of said previously stored message.

5. A two-way selective call receiving device as recited in claim 1 wherein said controller marks the previously stored message in the memory as a prior message determined to have the same identifier as said given identifier as a message for which no response is allowed.

6. A two-way selective call receiving device, comprising:

a receiver for receiving a message and an identifier associated with said message, said identifier falling within a limited range of possible unique identifiers that are repeatable;

a memory for storing the messages and the identifiers associated with said messages in a table representing each identifier within said limited range of possible unique identifiers associated with the received messages;

a controller responsive to the receipt of a message having a given identifier for determining whether said table has a previously stored message that is associated with an identifier that is the same as said given identifier, said controller being responsive to a determination that a previously stored message is stored in said table with the same given identifier for preventing a response to said previously stored message from thereafter being made; and a transmitter, coupled to the controller, for transmitting the response to the received message wherein said response is associated with said given identifier of the received message.

7. A two-way selective call receiving device as recited in claim 6 wherein said memory stores in association with a received message an indication of whether a response is allowed to said message.

8. A two-way selective call receiving device as recited in claim 7 wherein said controller changes said indication for a particular message in response to the receipt of a new message having the same identifier as said particular message.

9. A two-way selective call receiving device as recited in claim 7 wherein a message is maintained in said memory until a user deletes said message or until the controller automatically deletes said message on a first-in-first-out basis regardless of whether no response is allowed to the message.

10. A two-way selective call receiving device as recited in claim 6 wherein said table only stores information identifying the last message received in association with a given identifier.

11. A two-way selective call receiving device as recited in claim 6 including a display for indicating to a user whether a response to a received message is allowed.

12. A two-way selective call receiving device, comprising:

a receiver for receiving a message and an identifier associated with said message, said identifier falling within a limited set of possible identifiers that are reusable;

a memory for storing received messages in a table representing each identifier within said limited set of possible identifiers associated with the received messages;

a controller responsive to the receipt of a message having a given identifier for determining whether said table stores information for a prior message in association with said given identifier, said controller prevents a response to the prior message in response to a determination that the prior message is stored in said table in association an identifier that is the same as the given identifier of the received message; and a transmitter, coupled to the controller, for transmitting the response to the received message wherein said response is associated with said given identifier of the received message.

13. A two-way selective call receiving device as recited in claim 12 wherein said memory stores in association with a received message a flag indicating whether a response can be made to the message and said controller prevents a response to a prior message from being made by adjusting the flag stored in the memory in association with the prior message to indicate that a response cannot be made to the prior message.

14. A two-way selective call receiving device as recited in claim 12 wherein a message is maintained in said memory until a user deletes said message or until the controller automatically deletes said message on a first-in-first-out basis regardless of whether no response is allowed to the message.

15. A two-way selective call receiving device as recited in claim 12 including a display for indicating to a user whether a response to a received message is allowed.

16. A two-way selective call receiving device, comprising:

a receiver for receiving a message and an identifier associated with said message, said identifier falling within a limited set of possible identifiers that are reusable;

a memory for storing received messages and information associated with a received message indicating whether a response to the message is allowed or not, the memory stores the information in a table representing each identifier within said limited set of possible identifiers associated the received messages for identifying one received message stored in said memory;

a controller responsive to the receipt of a message having a given identifier for determining whether said table stores information identifying a prior message having said given identifier, said controller prevents a response to the prior message in response the prior message having an identifier that is same as said given identifier of the received message; and a transmitter, coupled to the controller, for transmitting the response to the received message wherein said response is associated with said given identifier of the received message.

17. A two-way selective call receiving device as recited in claim 16 wherein said information, stored in said memory indicating whether a response to a message is allowed or not, is a flag.

18. A two-way selective call receiving device as recited in claim 17 wherein said controller clears said flag to change the information associated with a prior message to indicate that a response is not allowed to the prior message.

19. A two-way selective call receiving device as recited in claim 17 wherein the table only stores information identifying the last message received in association with a given identifier.

20. A two-way selective call receiving device as recited in claim 16 including a display for indicating to a user whether a response to a received message is allowed.

21. A method for tracking received messages in a two-way selective call receiving device to enable a response to be correlated with an associated message for which the response was generated, comprising the steps of:

receiving a message and a given identifier associated with said message, said identifier falling within a limited set of possible identifiers that are reusable;

storing in a memory information tracking messages received with said identifiers;

searching said memory to determine whether a prior message has been received with an identifier that is the same as said given identifier; and preventing a response to said prior message from thereafter being transmitted if said controller determines that the prior message has been received with an identifier that is the same as said given identifier.

22. A method for tracking received messages in a two-way selective call receiving device to enable a response to be correlated with an associated message for which the response was generated, comprising the steps of:

receiving a message and a given identifier associated with said message, said identifier falling within a limited range of possible unique identifiers that are reusable;

storing received messages in a memory in a table representing each identifier within said the limited range of possible unique identifiers associated with a received message;

determining whether said table stores information for a prior message in association with an identifier that is the same as said given identifier; and, preventing a response to said prior message from thereafter being made if a determination is made that the identifier for the prior message is the same as said given identifier associated with the received message.

23. A method for tracking received messages in a two-way selective call receiving device to enable a response to be correlated with a recently received message, comprising the steps of:

receiving a message and a given identifier associated with said message, said identifier falling within a limited set of possible identifiers that are reusable;

storing in a memory received messages and information associated with the recently received message indicating whether a response to the message is allowed or not;

storing in a table each identifier within said set of possible identifiers associated the recently received message;

determining whether said table stores information identifying a prior message having an identifier that is the same as said given identifier; and changing information stored in said memory in association with said prior message to indicate that a response is not allowed to said prior message when the identifier of the prior message is the same as said given identifier of the recently received message.

* * * * *